United States Patent [19]

Sheets et al.

[11] Patent Number: 5,071,056
[45] Date of Patent: Dec. 10, 1991

[54] METHOD OF MAKING BRAKE SHOES

[75] Inventors: James H. Sheets, Fort Wayne, Ind.; Geoffrey T. Paton, Ontario, Canada

[73] Assignee: Dana Corporation, Toledo, Ohio

[21] Appl. No.: 510,437

[22] Filed: Apr. 18, 1990

Related U.S. Application Data

[63] Continuation-in-part of Ser. No. 408,946, Sep. 18, 1989, abandoned, which is a continuation of Ser. No. 339,862, Apr. 14, 1989, abandoned, which is a continuation of Ser. No. 115,368, Nov. 2, 1987, abandoned.

[51] Int. Cl.$^5$ .............................................. B23K 31/02
[52] U.S. Cl. .................................. 228/170; 228/176
[58] Field of Search .................. 228/170, 176, 57; 29/DIG. 37; 72/336–338; 59/15

[56] References Cited

U.S. PATENT DOCUMENTS

| | | | |
|---|---|---|---|
| 460,374 | 9/1891 | Hart | 72/336 |
| 1,946,061 | 2/1934 | Budd | 72/336 |
| 2,148,257 | 2/1939 | Budd | 228/170 |
| 2,988,032 | 6/1961 | Voissem | 72/336 |
| 3,268,987 | 8/1966 | Adams et al. | 228/170 |

FOREIGN PATENT DOCUMENTS 40619  3/1985  Japan ..................................... 72/336

OTHER PUBLICATIONS

Metals Handbook Ninth Edition, vol. 14, "Blank Layout", pp. 449,450, copyright 4–1988.

*Primary Examiner*—Samuel M. Heinrich
*Attorney, Agent, or Firm*—Marshall & Melhorn

[57] ABSTRACT

Brake shoe ribs are formed in a continuous strip stock utilizing a method to decrease the amount of trim stock. The strip stock is selected to have a width approximately equal to the maximum dimension between the ends of a rib to reduce trim stock along the edges of the strip. Each rib is formed with a pair of notches in an outer periphery and the ends of an adjacent rib extend adjacent the notches to reduce the amount of trim stock between the ribs. A brake shoe table is attached to the outer periphery of a rib by continuous welding along both sides of the rib even across the spaces defined by the notches and a brake lining is attached to an outer surface of the table.

23 Claims, 2 Drawing Sheets

METHOD OF MAKING BRAKE SHOES

This application is a continuation-in-part of application Ser. No. 07/408,946, filed Sept. 18, 1989, which is a continuation of application Ser. No. 07/339,862, filed Apr. 14, 1989, which is a continuation of application Ser. No. 07/115,368, filed Nov. 2, 1987, all now abandoned.

BACKGROUND OF THE INVENTION

The invention relates generally to a method of forming brake shoes for vehicles and, in particular, to brake shoe ribs formed to be nested together to reduce the amount of material required in the manufacturing process.

In the prior art, brake shoe ribs were formed from a continuous strip of material which allowed for trim stock around each rib. The trim stock represented both additional material costs to the brake rib manufacturer, and additional processes for the trimming of the excess material from the brake shoe rib. Each rib was welded to a brake shoe table to which lining would be attached.

One prior art method for manufacturing a drum brake shoe is by forming a plurality of connected blanks from a strip of material. The plurality of blanks are each bent to form an arcuate outer surface with adjoining sides, and are cut individually from the remaining plurality of blanks. The blanks are trimmed to remove the excess material, and friction lining material is attached.

In another prior art method, a strip of shoe rim steel has holes punched into it, and a lining is molded to it in segments with a flat or curved top. The strip is then bent at locations between the lining segments so as to remain flat and not destroy the bond between the rim and the lining material. The assembly is trimmed to length, a web or rib is attached and the lining pads ground to a final dimension.

SUMMARY OF THE INVENTION

The invention described herein provides a method for forming a plurality of brake shoe ribs which have been designed to use a minimum amount of material in the manufacturing process. In particular, the present invention eliminates trim stock at the top and bottom of the brake shoe rib and relief notches are added on the outside periphery of the rib to accommodate the nesting of the next stamped rib.

In accordance with the present invention, a strip of continuous flat metal stock having a width approximately equal to the longest dimension between ends of individual brake shoes is fed into a forming machine. The forming machine is typically a metal press of sufficient size containing a forming die corresponding to the particular design of the brake shoe rib to be formed. The forming of the brake shoe rib involves a metal stamping process whereby the cooperating faces of the forming die are brought together with sufficient force to form the rib from the flat metal stock.

During the process, a first brake shoe rib is formed in the continuous flat metal stock with at least two notches in the outer periphery of the rib. A second brake shoe rib is formed adjacent the outer periphery of the first brake shoe rib with the ends of the second brake shoe rib extending into the notched out areas of the first brake shoe rib. The flat metal stock is continuously fed through the forming machine in steps so as to form a plurality of brake shoe ribs in which each adjacent rib nests into the notched out areas of the preceding rib.

The rib is assembled into a brake shoe by attaching it at the outer periphery to an inwardly curved surface of a brake shoe table. A continuous weld is formed along each side of the rib where the outer periphery abuts the table surface and across the openings formed by the notches. A brake facing material is attached to an outwardly curved surface of the table to complete the brake shoe.

It is an advantage of the present invention that a brake shoe rib is provided without the excess trim stock material required in current brake shoe rib forming methods. Furthermore, the need for trimming the brake shoe ribs of the excess trim stock, and the associated processes for trimming the trim stock can be eliminated. The advantages of the present invention result in an estimated ten percent to twenty percent reduction in the material previously required to manufacture brake ribs, and a further economic benefit can be realized as a result of eliminating the associated trimming process.

DESCRIPTION OF THE PREFERRED EMBODIMENT

Figure 1:
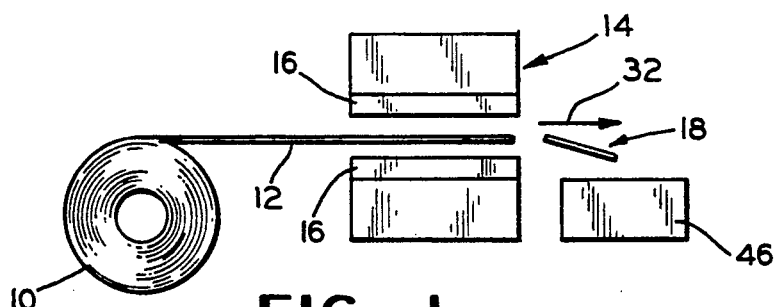
FIG. 1 is a front elevation schematic view of an apparatus for performing the method of forming brake shoe ribs according to the present invention.

Referring to the drawings, FIG. 1 shows a coil of strip stock material 10 being unrolled to provide a strip of metal stock 12 which is continuously fed into a forming machine 14. The width of the metal stock 12, which is mild steel such as SAE 950 and 1035 for example, is approximately equal to the longest dimensions between ends of individual brake shoes.

Figure 2:
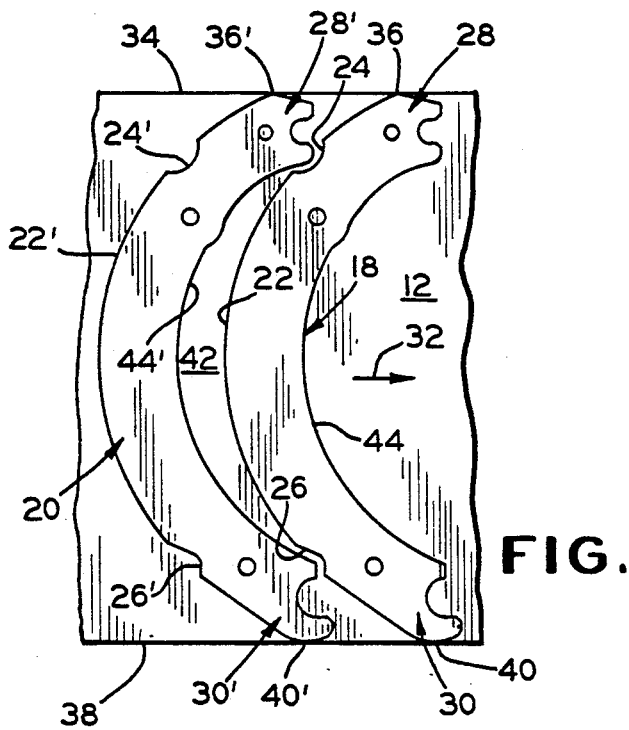
FIG. 2 is a plan view of a piece of strip stock having brake shoe ribs formed therein according to the present invention.

The metal stock 12 enters the forming machine 14, which can be a metal stamping press, and is positioned between a pair of cooperating metal forming dies 16. The die members are closed under pressure forming a first brake shoe rib 18, as shown in FIG. 2, in the metal strip 12. The strip 12 is advanced to a position whereby enough stock is provided to form a second brake shoe rib 20 identical to and adjacent the first rib 18.

As best shown in FIG. 2, the second brake shoe rib 20 is formed adjacent an outer periphery 22 of the first brake shoe rib 18. The outer periphery 22 has a pair of notches 24 and 26 formed therein adjacent an upper end 28 and a lower end 30 respectively of the rib 18. The notches 24 and 26 extend inwardly into the body of the rib from the outer periphery 22. The upper end 28' and the lower end 30' of the second brake shoe rib 20 extend into the notches 24 and 26 respectively of the first brake shoe rib 18, thereby minimizing the amount of stock material used for forming the ribs. The process continues as the strip 12 is advanced in the direction of an arrow 32 through the forming machine 14 to form a plurality of substantially identical brake shoe ribs, the ends of the next rib extending into notches 24' and 26' formed in an outer periphery 22' of the rib 20.

The minimization of the strip stock material 12 used in the forming of the brake shoe rib in the present invention is also a result of the elimination of trim stock at the top and the bottom of the rib, as well as by the ability to nest the ends of the next stamped rib within the notches 24 and 26 of the preceding rib. The present invention is estimated to save between ten percent and twenty percent of the material previously required to manufacture brake ribs. The width of the strip 12 is equal to the distance between an upper edge surface 34 defining a junction point 36 of the outer periphery 22 and the upper end 28, and a lower edge surface 38 defining a junction point 40 of the outer periphery 22 and the lower end 30 of the rib 18. The distance between the points 36 and 40 represents the longest dimension between the ends of the rib. The trim stock is thus an area of metal 42 between the outer periphery 22 of the rib 18, and an inner periphery 44' and the ends 28' and 30' of the rib 20.

A plurality of brake ribs using minimal amounts of the metal stock 12 can be formed by continuously advancing the metal stock 12 in steps in the direction of the arrow 32 within the forming machine 14 so as to allow the ends of each subsequent rib formed to nest within the notches 24 and 26 of the preceding rib formed. The plurality of ribs are exited into a receiving tub 46 as shown in FIG. 1 for transfer to additional operations used in the formation of a brake shoe assembly.

Figure 3:
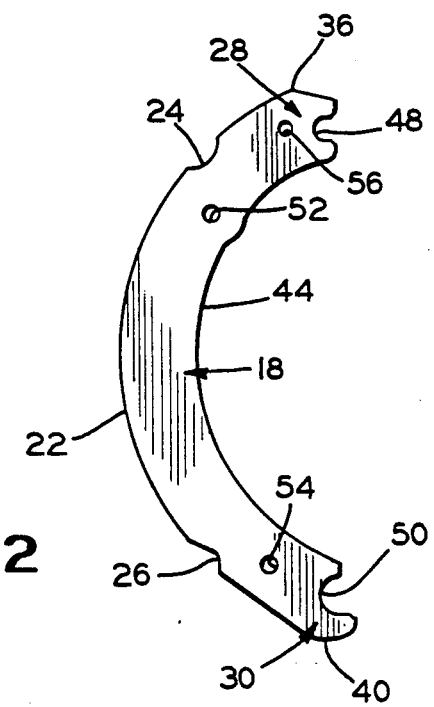
FIG. 3 is a plan view of a finished brake shoe rib according to the present invention.

Turning now to FIG. 3, a finished brake shoe rib 18 is shown with the notches 24 and 26 formed along the outer periphery 22 of the rib. The rib 18 is configured so that the depth of the notches 24 and 26 is limited, thereby preventing any adverse effect on the structural strength of the final brake shoe assembly. The rib ends 28 and 30 are designed to be the upper and lower edges respectively of the metal stock material 12 from which the rib 18 is formed in order to eliminate the trim stock previously required to manufacture brake ribs. The rib ends 28 and 30 are further configured with notches 48 and 50 respectively, which locate the brake shoes in their proper positions when installed on a motor vehicle. The rib 18 is also provided with a pair of apertures 52 and 54 which are used to attach return springs (not shown) which are required for the proper functioning of the braking system. The aperture 52 is formed adjacent the notch 24 and the aperture 54 is formed adjacent the notch 26. In addition, an aperture 56 can be formed in the rib 18 adjacent the notch 48 for retaining a cam spring (not shown) should one be required.

Figure 4:
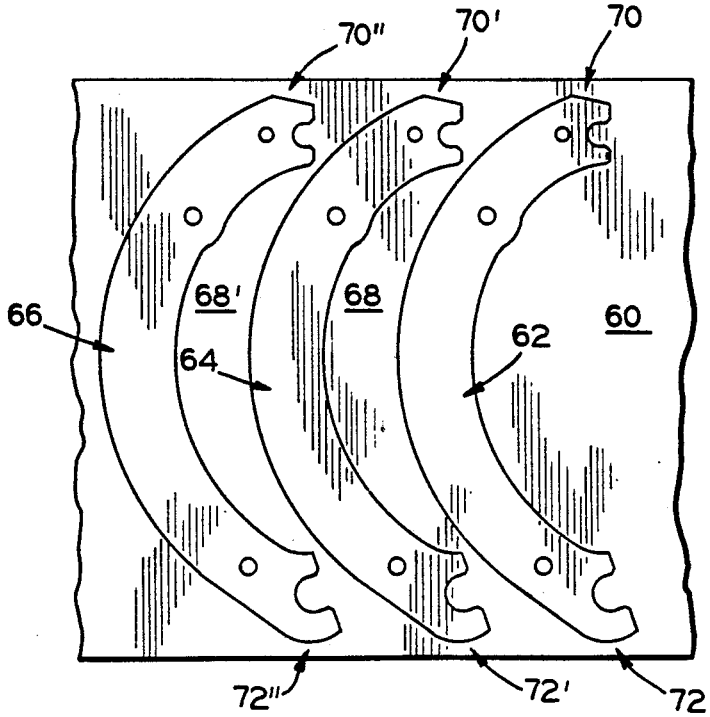
FIG. 4 is a plan view of a piece of strip stock having brake shoe ribs formed therein according to the prior art methods.

There is shown in FIG. 4 a portion of a strip of stock material 60 which was utilized in a prior art method of forming brake shoe ribs. A plurality of ribs 62, 64 and 66 are formed in the strip 60 by stamping leaving substantial trim stock as an area of metal 68 and 68' between each adjacent pair of ribs as well as an upper edge area 70, 70' and 70" and a lower edge area 72, 72' and 72" adjacent the edges of the strip 60. The present invention provides a method and a brake shoe rib configuration for reducing the amount of trim material in the areas 68 and 68' and for eliminating the trim material in the areas 70 and 72, 70' and 72', and 70" and 72".

Figure 5:
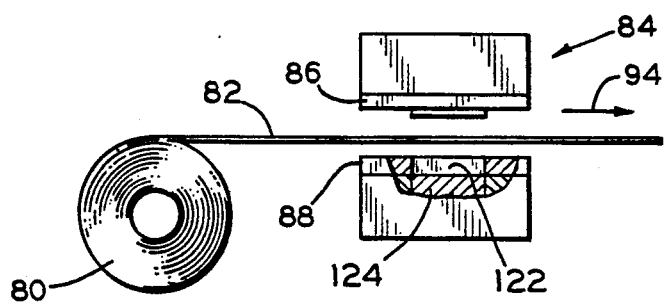
FIG. 5 is a front elevation schematic view of an apparatus for performing an alternate method of forming brake shoe ribs according to the present invention.
Figure 6:
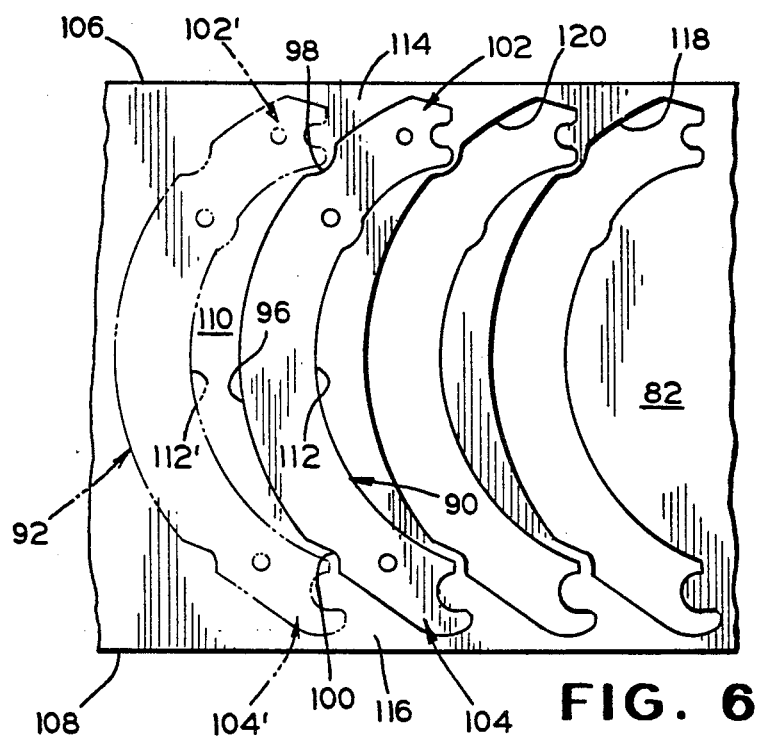
FIG. 6 is a plan view of a piece of strip stock having brake shoe ribs formed therein according to the alternate method of the present invention.

In FIGS. 5 and 6 there is shown an alternate method of forming brake shoe ribs according to the present invention. A coil of strip stock material 80 is unrolled to provide a strip of metal stock 82 which is continuously fed into a forming machine 84. The width of the metal stock 82, which is mild steel such as SAE 950 and 1035 for example, is slightly larger than to the longest dimensions between ends of individual brake shoes.

The metal stock 82 enters the forming machine 84, which can be a metal stamping press, and is positioned between a pair of cooperating metal forming dies, an upper die 86 and a lower die 88. The die members are closed under pressure forming a first brake shoe rib 90, as shown in FIG. 6, in the metal strip 82. The strip 82 is advanced to a position whereby enough stock is provided to form a second brake shoe rib 92, shown in phantom, identical to and adjacent the first rib 90. The process continues as the strip 82 is advanced in the direction of an arrow 94, FIG. 5, through the forming machine 84 to form a plurality of substantially identical brake shoe ribs.

As best shown in FIG. 6, the second brake shoe rib 92 is formed adjacent an outer periphery 96 of the first brake shoe rib 90. The outer periphery 96 has a pair of notches 98 and 100 formed therein adjacent an upper end 102 and a lower end 104 respectively of the rib 90. The notches 98 and 100 extend inwardly into the body of the rib from the outer Periphery 96. An upper end 102' and a lower end 104' of the second brake shoe rib 92 extend into the notches 98 and 100 respectively of the first brake shoe rib 90, thereby minimizing the amount of stock material used for forming the ribs.

The minimization of the strip stock material 82 used in the forming of the brake shoe rib in the present invention is also a result of the reduction of trim stock at the top and the bottom of the rib, as well as by the ability to nest the ends of the next stamped rib within the notches 98 and 100 of the preceding rib. The present invention is estimated to save between ten percent and twenty percent of the material previously required to manufacture brake ribs. The width of the strip 82 between a first edge 106 and a generally parallel second edge 108 is slightly larger than the longest distance between the peripheries of the upper end 102 and the lower end 104 of the rib 90. The trim stock is thus an area of metal 110 between the outer periphery 96 of the rib 90, and an inner periphery 112' of the rib 92, plus an area of metal 114 between the upper end 102 and the edge 106, plus an area of metal 116 between the lower end 104 and the edge 108.

As stated above, a plurality of brake shoe ribs using minimal amounts of the metal stock 82 can be formed by continuously advancing the metal stock 82 in steps in the direction of the arrow 94 within the forming machine 84 so as to allow the ends of each subsequent rib formed to nest within the notches of the preceding rib formed. As shown in FIG. 6, a first preceding rib was formed leaving an outline 118 in the strip 82. A second preceding rib was then formed leaving an outline 120 positioned between the outline 118 and the rib 90. The material remaining in the strip 82 after the ribs have been formed and removed is known as a skeleton. The ribs can be removed from the skeleton in any suitable manner. As shown in FIG. 5, the lower die 88 can be provided with a recess or cavity 122 open to the underside of the strip 82. When the dies close, the upper die 86 shears the metal and forces the rib into the cavity 122 so that the strip 82 can be advanced to form the next rib. Any suitable means can be utilized to remove the rib from the cavity 122 such as a bottom wall of the cavity being formed on a slide 124 which retracts to discharge the rib to a receptacle and returns to position before the next rib is formed.

The skeleton represents the minimum trim stock which will still prevent rollover of the edges of the rib from shearing the metal strip 82 as the rib is formed. For example, if the longest dimension between the ends 102 and 104 of the rib 90 is thirteen inches, the distance between the edges 106 and 108 of the strip 82 can be about thirteen and one half inches. The distance between the inner periphery 112' at the ends 102' and 104' and the outer periphery 96 at the notches 98 and 100 can be about 0.030 inches.

Figure 7:
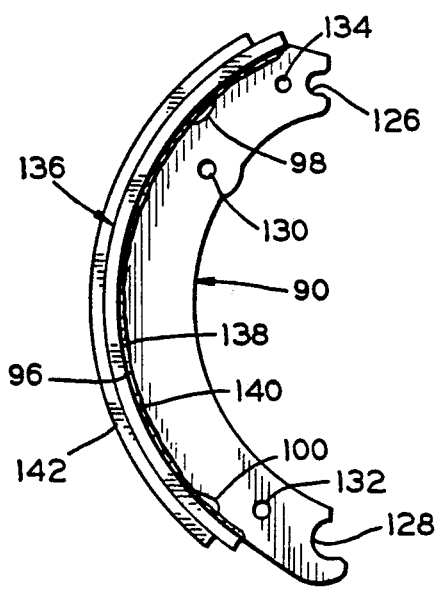
FIG. 7 is a front elevation view of a finished brake shoe according to the present invention.
Figure 8:
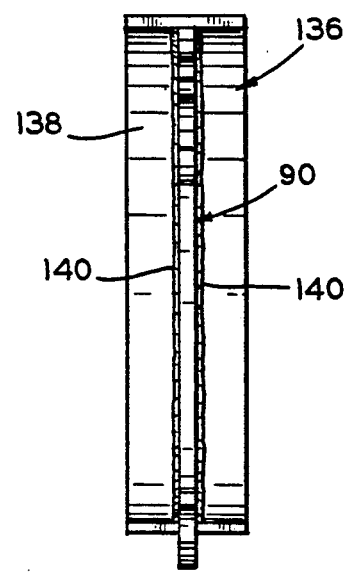
FIG. 8 is an side elevation view of the finished brake shoe shown in FIG. 7.

Turning now to FIGS. 7 and 8, a finished brake shoe rib 90 is shown with the notches 98 and 100 formed along the outer periphery 96 of the rib. The rib 96 is configured so that the depth of the notches is limited, thereby preventing any adverse effect on the structural strength of the final brake shoe assembly. The rib ends 102 and 104 are configured with notches 126 and 128 respectively, which locate the brake shoes in their proper positions when installed on a motor vehicle. The rib 90 is also provided with a pair of apertures 130 and 134 which are used to attach return springs (not shown) which are required for the proper functioning of the braking system. The aperture 130 is formed adjacent the notch 98 and the aperture 132 is formed adjacent the notch 100. In addition, an aperture 134 can be formed in the rib 90 adjacent the notch 126 for retaining a cam spring (not shown) should one be required.

A brake shoe is formed by attaching the rib 90 to a brake shoe table 136. The table is generally rectangular in shape and extends in an arcuate plane. An inner surface 138 of the table 136 is defined by the same radius as defines the outer periphery 96 of the rib 90. The rib 90 is attached to the table by any suitable means such as by welding. A continuous weld bead 140 is formed on both sides of the rib 90 along the entire length of the inner surface 138 even across the notches 98 and 100. The brake shoe is completed by attaching a brake lining or facing material 142 on an outer surface of the table by any suitable means such as adhesive or rivets. The present invention provides a method and a brake shoe rib configuration for reducing the amount of trim material in the areas 110 and the areas 114 and 116. The present invention concerns a method of making a brake shoe comprising the steps of providing a strip of continuous metal stock having a width approximately equal to the longest dimension between ends of individual brake shoe ribs; feeding the stripstock into a forming machine; forming a body of a first brake shoe rib in the strip stock with opposite ends of the rib body adjacent opposite edges of the strip stock and at least one notch at a predetermined position in an outer periphery of the rib body, the notch extending inwardly into the rib body from the outer periphery; forming a body of a second brake shoe rib in the strip stock oriented the same as and adjacent to an outline of the first brake shoe rib with one end of an inner periphery of the second brake shoe rib extending adjacent to a portion of the outline representing the outer periphery of the first brake shoe rib at the one notch of the first brake shoe rib; removing the first brake shoe rib from the strip stock; and attaching a brake shoe table to the outer periphery of the first brake shoe rib. The first and second brake shoe rib bodies each are formed with the outer periphery having a larger radius than the inner periphery whereby the rib bodies are difficult to nest when oriented in the same direction and the one notch of the first rib body permits closer nesting of the second brake shoe rib with the first brake shoe rib. The notch is formed in a nonfunctional portion of the first brake shoe rib body.

In accordance with the provisions of the patent statutes, the principle and mode of operation of the present invention have been described in what is considered to represent the preferred embodiment. However, it should be understood that the invention may be practiced other than as specifically illustrated and described without parting from its spirit or scope.

What is claimed is:

1. A method of making a brake shoe comprising the steps of:
    a. providing a strip of continuous metal stock having a width approximately equal to the longest dimension between ends of individual brake shoe ribs;
    b. feeding said strip stock into a forming machine;
    c. forming a body of a first brake shoe rib in said strip stock with opposite ends of said rib body adjacent opposite edges of said strip stock and at least two notches at predetermined positions in an outer periphery of said rib body, said outer periphery having a predetermined radius of curvature and said notches extending inwardly into said rib body from said outer periphery eliminating a portion of said first brake shoe rib body;
    d. forming a body of a second brake shoe rib in said strip stock oriented the same as and adjacent to an outline of said first brake shoe rib with opposite ends of a inner periphery of said second brake shoe rib extending adjacent to a portion of said outline representing said outer periphery of said first brake shoe rib at associated ones of said notches of said first brake shoe rib;
    e. removing said first brake shoe rib from said strip stock; and
    f. attaching a brake shoe table to said outer periphery of said first brake shoe rib.

2. The method for forming a brake shoe according to claim 1 wherein said metal stock is mild steel.

3. The method for forming a brake shoe according to claim 1 wherein said forming machine is a stamping press.

4. The method for forming a brake shoe according to claim 3 wherein said stamping press contains cooperating die members for forming said ribs.

5. The method for forming a brake shoe according to claim 1 including a step of attaching a lining material to said brake shoe table.

6. The method for forming a brake shoe according to claim 1 wherein said step e. is performed before said step d.

7. A method of forming a plurality of brake shoes comprising the steps:
    a. providing a strip of continuous metal stock having a width approximately equal to a maximum dimension between ends of a brake shoe rib;
    b. forming a first brake shoe rib in said strip having a pair of notches at predetermined positions along an outer periphery of said first rib eliminating a nonfunctional portion of said first brake shoe rib;
    c. forming a second brake shoe rib in said strip nested with an outline of said first rib and having a pair of notches at said predetermined positions along an outer periphery of said second rib eliminating a portion of said second brake shoe rib, opposite ends of an inner periphery of said second brake shoe rib extending adjacent a portion of said outline at associated ones of said pair of notches of said first rib; and d. repeating step c. to form a plurality of brake shoe ribs with outlines of adjacent ones of said ribs nested together.

8. The method for forming a plurality of brake shoes according to claim 7 including a step of removing said brake shoe ribs from said strip stock.

9. The method for forming a plurality of brake shoes according to claim 8 wherein said step of removing is performed for each of said brake shoe ribs before a subsequent one of said brake shoe ribs is formed.

10. The method for forming a plurality of brake shoes according to claim 7 including a step of attaching a brake shoe table to said outer periphery of each of said brake shoe ribs.

11. The method for forming a plurality of brake shoes according to claim 10 wherein said step of attaching is performed by continuously welding said shoe table to said brake shoe rib along both sides of said outer periphery of each of said brake shoe ribs.

12. The method for forming a brake shoe according to claim 10 including a step of attaching a lining material to said brake shoe table.

13. A method of making brake shoes comprising the steps of:
 a. providing a strip of continuous metal stock having a width approximately equal to the longest dimension between ends of individual brake shoe ribs to be formed;
 b. feeding said strip stock into a forming machine between a pair of metal forming dies;
 c. closing said dies under pressure to form a first brake shoe rib in said strip stock oriented with a longest dimension between ends across the width of said strip stock and with at least two notches at predetermined positions adjacent said ends and in an outer periphery of said first rib eliminating a portion of said first brake shoe rib; and
 d. opening said dies, advancing said strip stock and closing said dies under pressure to form a second brake shoe rib adjacent an outline of said outer periphery of said first rib in said strip stock and oriented substantially the same as said first rib with opposite ends of the said second rib extending adjacent portion s of said outer periphery representing associated ones of said notches of said first rib, an inner periphery of said second rib being spaced from said outline of said first rib whereby trim stock is reduced adjacent both ends of said first and second ribs and trim stock is reduced between said outer periphery of said first rib and said inner periphery of said second rib.

14. The method of making brake shoes according to claim 13 wherein said metal stock is mild steel.

15. The method of making brake shoes according to claim 13 wherein said forming machine is a stamping press.

16. The method of making brake shoes according to claim 13 including a step of limiting said notches in depth to prevent any adverse effect on the structural strength of a brake shoe assembly incorporating one of said ribs.

17. The method of making brake shoes according to claim 13 including repeating step d. to form a plurality of brake shoe ribs with adjacent ones of said ribs nested together whereby trim stock is eliminated at both ends of and is reduced between adjacent ones of said ribs.

18. The method of making brake shoes according to claim 13 including repeating step d. to form a plurality of brake shoe ribs with adjacent ones of said ribs nested together whereby when said ribs are removed, a skeleton of trim stock surrounding outlines of said ribs is reduced at both ends of and between adjacent ones of said ribs.

19. The method for forming a plurality of brake shoes according to claim 13 including a step of attaching a brake shoe table to said outer periphery of each of said brake shoe ribs by continuously welding said shoe table to said brake shoe rib along both sides of said outer periphery of each of said brake shoe ribs and attaching a lining material to said brake shoe table.

20. The method of making brake shoes according to claim 13 wherein each of said ribs are formed with said ends approximately one quarter inch from adjacent edges of said strip stock and a distance of approximately 0.030 inch between said inner periphery of said ends and said outer periphery at said associated notches of a preceding one of said ribs.

21. A method of making a brake shoe comprising the steps of:
 a. providing a strip of continuous metal stock having a width approximately equal to the longest dimension between ends of individual brake shoe ribs;
 b. feeding said strip stock into a forming machine;
 c. forming a body of a first brake shoe rib in said strip stock with opposite ends of said rib body adjacent opposite edges of said strip stock and at least one notch at a predetermined position in an outer periphery of said rib body, said notch extending inwardly into said rib body from said outer periphery;
 d. forming a body of a second brake shoe rib in said strip stock oriented the same as and adjacent to an outline of said first brake shoe rib with one end of an inner periphery of said second brake shoe rib extending adjacent to a portion of said outline representing said outer periphery of said first brake shoe rib at said one notch of said first brake shoe rib;
 e. removing said first brake shoe rib from said strip stock; and
 f. attaching a brake shoe table to said outer periphery of said first brake shoe rib.

22. The method of making a brake shoe according to claim 21 wherein said first and second brake shoe rib bodies each are formed with said outer periphery having a larger radius than said inner periphery whereby said rib bodies are difficult to nest when oriented in the same direction and said one notch of said first rib body permits closer nesting of said second brake shoe rib with said first brake shoe rib.

23. The method of making a brake shoe according to claim 21 wherein said one notch is formed in a nonfunctional portion of said first brake shoe rib body.

* * * * *